US012746461B2

(12) United States Patent
Koriyama et al.

(10) Patent No.: US 12,746,461 B2
(45) Date of Patent: Sep. 29, 2026

(54) CONTROLLER

(71) Applicant: Nintendo Co., Ltd., Kyoto (JP)

(72) Inventors: Kazuhiko Koriyama, Kyoto (JP); Shigenobu Arai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 373 days.

(21) Appl. No.: 18/421,565

(22) Filed: Jan. 24, 2024

(65) Prior Publication Data

US 2024/0157231 A1 May 16, 2024

Related U.S. Application Data

(63) Continuation of application No. PCT/JP2021/028471, filed on Jul. 30, 2021.

(51) Int. Cl.
*A63F 13/24* (2014.01)
*A63F 13/218* (2014.01)

(52) U.S. Cl.
CPC ............ *A63F 13/24* (2014.09); *A63F 13/218* (2014.09)

(58) Field of Classification Search
CPC .................... A63F 13/24; A63F 13/245; A63F 2300/1043; A63F 2300/1062
See application file for complete search history.

(56) References Cited

U.S. PATENT DOCUMENTS 4,459,440 A * 7/1984 Wiczer ............... G05G 9/04796 200/283
4,748,323 A * 5/1988 Holiday ................... G01V 8/20 250/221
6,352,477 B1 3/2002 Soma
7,557,796 B2 * 7/2009 Voto ....................... G05G 9/047 345/161
2010/0255915 A1 * 10/2010 Spradley .................. G09B 9/08 463/38
2014/0094310 A1 * 4/2014 Bleich ................. G07F 17/3209 463/38
(Continued)

FOREIGN PATENT DOCUMENTS

EP 0 056 315 7/1982
EP 1 900 406 3/2008
(Continued)

OTHER PUBLICATIONS

Jul. 17, 2024 Office Action issued in European Patent Application No. 21951936.0, pp. 1-8.
(Continued)

*Primary Examiner* — Milap Shah
(74) *Attorney, Agent, or Firm* — NIXON & VANDERHYE, P.C.

(57) ABSTRACT

A controller includes a substrate, a stick, and a functional component. The stick is to be operated by a user. The functional component performs a controller function, and it is different from the stick. The substrate includes a front surface and a rear surface opposite to the front surface. The stick includes an arm that moves as the stick is operated, the arm extending from a side of the front surface toward a side of the rear surface. The substrate includes a circuit provided on the front surface and electrically connected to the functional component and a first sensor provided on the rear surface, the first sensor directly or indirectly detecting a motion of the arm.

10 Claims, 11 Drawing Sheets

(56) References Cited

U.S. PATENT DOCUMENTS

| | | | |
|---|---|---|---|
| 2017/0304717 | A1 | 10/2017 | Huang |
| 2020/0406131 | A1 | 12/2020 | Benson |

FOREIGN PATENT DOCUMENTS

| | | | |
|---|---|---|---|
| JP | 6-079048 | | 11/1994 |
| JP | 3066234 | U | 2/2000 |
| JP | 2001043012 | A | 2/2001 |
| JP | 2006073249 | A | 3/2006 |
| JP | 2008200140 | A | 9/2008 |
| JP | 6694196 | B1 | 5/2020 |
| JP | 2020523673 | A | 8/2020 |
| WO | 2020/174902 | | 9/2020 |

OTHER PUBLICATIONS

International Search Report for PCT/JP2021/028471 dated Oct. 5, 2021, 4 pages.

* cited by examiner

CONTROLLER

This nonprovisional application claims priority on International Patent Application PCT/JP2021/028471 filed with the Japan Patent Office on Jul. 30, 2021, the entire contents of which are hereby incorporated by reference.

FIELD

The present technology relates to a controller.

BACKGROUND AND SUMMARY

A structure in which a stick module is mounted on a substrate in a game controller has been known.

An exemplary embodiment provides a controller that includes a substrate, a stick, and a functional component. The stick is to be operated by a user. The functional component performs a controller function, and it is different from the stick. The substrate includes a front surface and a rear surface opposite to the front surface. The stick includes an arm that moves as the stick is operated, the arm extending from a side of the front surface toward a side of the rear surface. The substrate includes a circuit provided on the front surface and electrically connected to the functional component and a first sensor provided on the rear surface, the first sensor directly or indirectly detecting a motion of the arm.

According to the controller according to the present technology, the stick includes the arm that moves as the stick is operated, the arm extending from the side of the front surface to the side of the rear surface of the substrate. The substrate includes the circuit provided on the front surface and electrically connected to the functional component and the first sensor provided on the rear surface, the first sensor directly or indirectly detecting a motion of the arm. Therefore, a space in the housing can effectively be utilized.

According to the controller, the stick may include a first member that rotates in a first direction of rotation with swing of the stick and a second member that rotates in a second direction of rotation with swing of the stick, the second direction of rotation being different from the first direction of rotation. The first member may include a first rotation shaft that is in parallel to the substrate and provided on the side of the front surface. The arm may move with rotation of the first rotation shaft.

According to the controller, the first rotation shaft is provided on the side of the front surface of the substrate and hence a notch or a hole for arrangement of the first rotation shaft does not have to be provided in the substrate. Therefore, a space for providing a notch or a hole in the substrate can be reduced. Consequently, high rigidity of the substrate can be maintained.

According to the controller, the controller may further include a movable component provided on the side of the rear surface, the movable component being movable in a direction in parallel to the substrate. The arm may move the movable component with rotation of the first rotation shaft. The first sensor may detect a motion of the movable component.

According to the controller, the movable component is provided on the side of the rear surface of the substrate and it is movable in the direction in parallel to the substrate. Therefore, a space in an upward-downward direction of the substrate can be reduced.

According to the controller, the arm may be connected to the first rotation shaft. A rear-surface-side end of the arm may rotate around the first rotation shaft, with rotation of the first rotation shaft.

According to the controller, the rear-surface-side end of the arm is located on the side of the rear surface of the substrate. The arm can thus have a longer length. Therefore, an amount of rotation of the rear-surface-side end that rotates around the first rotation shaft can be increased. Consequently, an amount of slide of the movable component increases. Therefore, a resolution of the movable component detected by the first sensor can be enhanced.

According to the controller, the substrate may be provided with a through portion. At least one of the stick, the first member, and the second member may be located in the through portion.

According to the controller, the stick may include a first member that swings in a first direction of swing with swing of the stick and a second member that swings in a second direction of swing with swing of the stick, the second direction of swing being different from the first direction of swing. The arm may move with swing of the first member.

According to the controller, the stick may be provided with a skirt. Swing of the skirt with swing of the stick may be restricted by the front surface or a restriction portion provided on the front surface. The movable component or the first sensor may be provided on a side opposite to the skirt with respect to the substrate.

According to the controller, the movable component or the first sensor is provided on the side opposite to the skirt with respect to the substrate. Therefore, swing can be restricted with the use of the skirt while the space in the direction in parallel to the substrate is reduced.

According to the controller, the controller may further include a second sensor. The second sensor may be provided in the restriction portion or between the restriction portion and the front surface.

According to the controller, the second sensor may include a first electrode and a second electrode distant from the first electrode. The second sensor detects a capacitance that varies in response to contact of the skirt. The controller may further include a flexible printed circuit electrically connected to the first electrode. The second electrode is provided on the substrate. The space in the upward-downward direction can thus be made smaller than in an example where the second electrode is distant from the substrate in the upward-downward direction.

According to the controller, the functional component may be a button. The button may include a button operated portion to be pressed in by the user and a first contact that can be in contact with the button operated portion. The controller may include a housing where the first contact is accommodated. The first contact may be located on the substrate. The button operated portion may be exposed to outside of the housing in a direction identical to a direction of exposure of a stick operated portion in the stick, the stick operated portion being to be operated by the user. In the necessity to press the button operated portion in to press the first contact, the small substrate and the small space in the housing can lead to reduction in amount of stroke or volume of the button in the upward-downward direction.

According to the controller, the stick may be movable as being pressed in in a direction from the front surface toward the rear surface. The controller may further include a second contact that is in contact with the first rotation shaft with movement of the stick as being pressed in. The second contact may be provided in a region in the front surface, the region being opposed to an end of the first rotation shaft. A pressed-in button function can thus be performed in the controller where the space in the housing is effectively utilized.

The foregoing and other objects, features, aspects and advantages of the present disclosure will become more apparent from the following detailed description of the present disclosure when taken in conjunction with the accompanying drawings.

DETAILED DESCRIPTION OF NON-LIMITING EXAMPLE EMBODIMENTS

Figure 1:
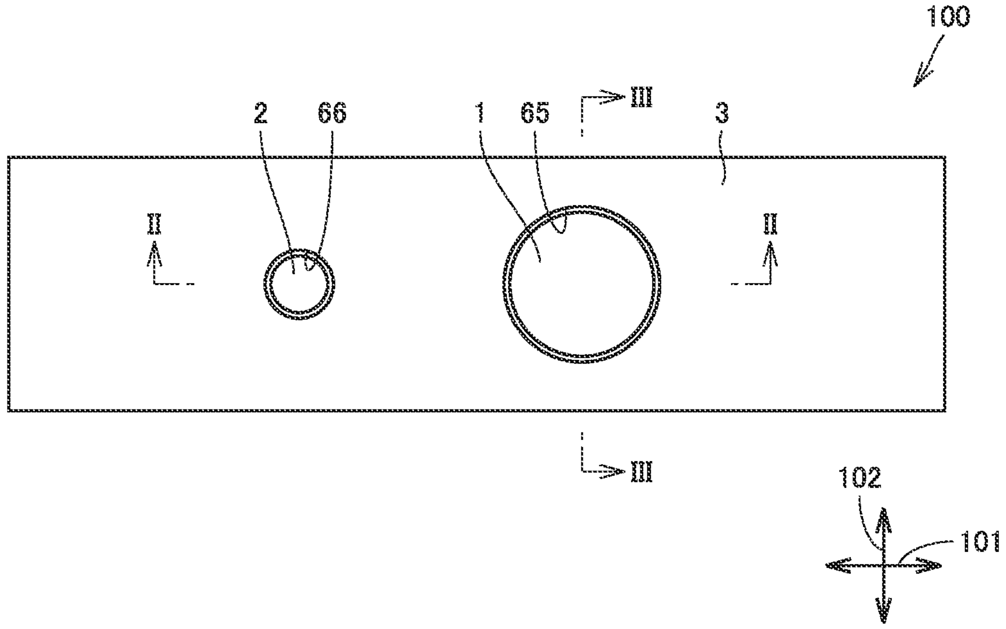
FIG. 1 shows an exemplary illustrative non-limiting drawing of a schematic plan view of a construction of a controller according to a first embodiment.

An embodiment of the present technology will be described in detail with reference to the drawings. The same or corresponding elements in the drawings have the same reference characters allotted and description thereof will not be repeated.

First Embodiment

[A. Controller]

A construction of a controller 100 according to a first embodiment will initially be described.

FIG. 1 is a schematic plan view showing the construction of controller 100 according to the first embodiment. As shown in FIG. 1, controller 100 according to the first embodiment mainly includes a housing 3, a stick 1, and a functional component 2. Housing 3 is, for example, substantially in a shape of a parallelepiped. Housing 3 is provided with a first through hole 65. Stick 1 is arranged in first through hole 65. A part of stick 1 is located on the outside of housing 3. Stick 1 is to be operated by a user. Stick 1 is swingable.

Functional component 2 is a component different from stick 1. Functional component 2 performs a controller function. A part of functional component 2 may be provided on a substrate 30. Functional component 2 is, for example, a button. Housing 3 is provided with a second through hole 66. The button is arranged in second through hole 66. A part of the button is located on the outside of housing 3. The button is to be operated by the user. Housing 3 extends along a first direction 101. First direction 101 is, for example, a longitudinal direction of housing 3. A second direction 102 is, for example, a direction of a short side of housing 3. Second direction 102 is orthogonal to first direction 101. In a plan view, stick 1 and the button may be aligned along first direction 101.

Figure 2:
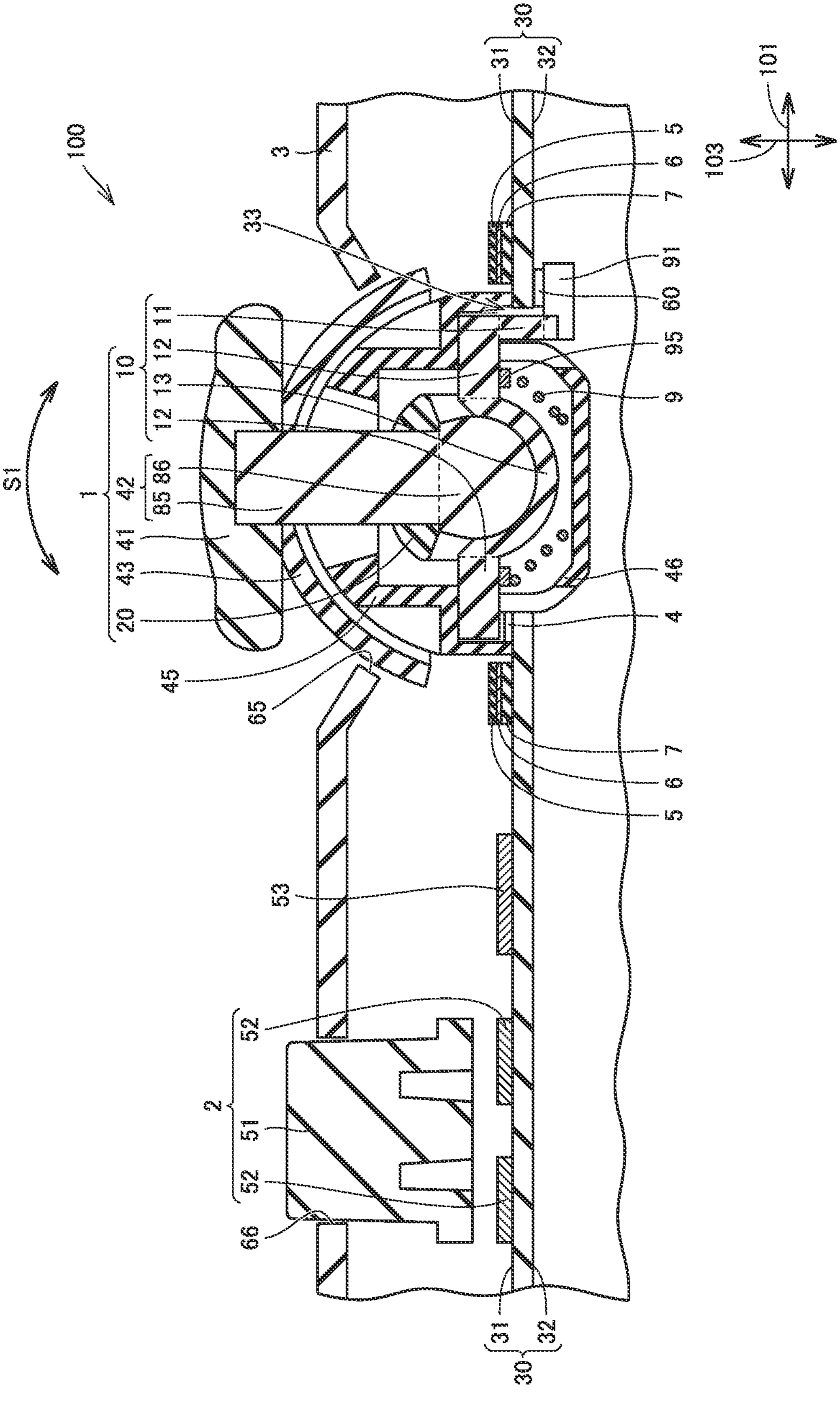
FIG. 2 shows an exemplary illustrative non-limiting drawing of a schematic cross-sectional view along the line II-II in FIG. 1.

FIG. 2 is a schematic cross-sectional view along the line II-II in FIG. 1. The cross-section shown in FIG. 2 is in parallel to first direction 101. As shown in FIG. 2, controller 100 according to the first embodiment includes substrate 30. Substrate 30 is arranged in the inside of housing 3. Substrate 30 includes a front surface 31 and a rear surface 32. Rear surface 32 is located opposite to front surface 31. Substrate 30 is provided with a through portion 33. Through portion 33 is a hole or a notch provided to pass through substrate 30 from front surface 31 to rear surface 32. A direction in parallel to a direction from front surface 31 toward rear surface 32 of substrate 30 is herein defined as a third direction 103. Each of first direction 101 and second direction 102 is perpendicular to third direction 103. Third direction 103 is an upward-downward direction. A direction from rear surface 32 toward front surface 31 is defined as an upward direction. A direction from front surface 31 toward rear surface 32 is defined as a downward direction.

As shown in FIG. 2, stick 1 includes a stick operated portion 41, a central shaft 42, a skirt 43, a first member 10, and a second member 20. Stick operated portion 41 is arranged on the outside of housing 3. Stick operated portion 41 is a portion to be operated by a user. Central shaft 42 is contiguous to stick operated portion 41. Central shaft 42 includes a main body portion 85 and a pullout prevention portion 86. Pullout prevention portion 86 is contiguous to main body portion 85. Main body portion 85 is located between stick operated portion 41 and pullout prevention portion 86. Central shaft 42 is located under stick operated portion 41. Central shaft 42 may extend along third direction 103.

Skirt 43 is contiguous, for example, to central shaft 42. Skirt 43 is arranged to surround central shaft 42. Skirt 43 is arranged in first through hole 65. Skirt 43 may be contiguous to stick operated portion 41. Skirt 43 is arranged under stick operated portion 41. Skirt 43 may increase in inner diameter as a distance from stick operated portion 41 is longer. From a different point of view, skirt 43 may increase in inner diameter from stick operated portion 41 toward substrate 30.

As shown in FIG. 2, controller 100 according to the first embodiment further includes a first casing 45, a second casing 46, a coil spring 9, and a support plate 95. First casing 45 is provided on a front surface 31 side of substrate 30. A part of second casing 46 is located in through portion 33. Coil spring 9 is arranged in the inside of second casing 46.

Support plate 95 is arranged on coil spring 9. First member 10 is arranged on support plate 95. First member 10 may lie between first casing 45 and second casing 46.

First member 10 includes a first arm 11, a first rotation shaft 12, and a first main body portion 13. First arm 11 moves as stick 1 is operated. First arm 11 extends from front surface 31 side toward rear surface 32 side of substrate 30. First arm 11 is arranged in through portion 33. First arm 11 passes through portion 33 to project from front surface 31 side toward rear surface 32 side. First arm 11 is contiguous to first rotation shaft 12. First rotation shaft 12 extends along a direction in parallel to substrate 30. First rotation shaft 12 extends, for example, along first direction 101.

As shown in FIG. 2, first rotation shaft 12 is contiguous to first main body portion 13. First rotation shaft 12 may be located on each of opposing sides of first main body portion 13. First main body portion 13 is in contact with pullout prevention portion 86. First main body portion 13 is curved as being recessed downward, in conformity with the shape of pullout prevention portion 86. First main body portion 13 may be located in through portion 33. First main body portion 13 may be surrounded by coil spring 9. First main body portion 13 may be arranged in the inside of second casing 46. As shown in FIG. 2, second member 20 is arranged on pullout prevention portion 86. Second member 20 may surround main body portion 85 of central shaft 42.

Controller 100 according to the first embodiment may include a cushion material 7, a flexible printed circuit 6, and a restriction portion 5. A first electrode 81 (see FIG. 10) is wired on substrate 30. Cushion material 7 is provided on first electrode 81. As shown in FIG. 1, flexible printed circuit 6 is provided on cushion material 7. Restriction portion 5 is provided on flexible printed circuit 6. A reinforcement plate of flexible printed circuit 6 may also serve as restriction portion 5. First electrode 81, cushion material 7, and a second electrode 82 may constitute a second sensor 80 (see FIG. 10). Functions of second sensor 80 will be described later.

As shown in FIG. 2, controller 100 according to the first embodiment may include a first movable component 91. First movable component 91 is provided on rear surface 32 side of substrate 30. First movable component 91 is moved by first arm 11. First movable component 91 is engaged with first arm 11. First arm 11 may be located on the outside of second casing 46. First movable component 91 may be located opposite to skirt 43 with respect to substrate 30. From a different point of view, in first direction 101 and second direction 102, skirt 43, substrate 30, and first movable component 91 are at least partially superimposed on one another, and in third direction 103, substrate 30 is located between skirt 43 and first movable component 91.

As shown in FIG. 2, controller 100 according to the first embodiment includes a first sensor 60. First sensor 60 is, for example, a carbon contact. First sensor 60 is provided on rear surface 32 of substrate 30. First sensor 60 is provided between rear surface 32 and first movable component 91. First sensor 60 may be located opposite to skirt 43 with respect to substrate 30. From a different point of view, in first direction 101 and second direction 102, skirt 43, substrate 30, and first sensor 60 are at least partially superimposed on one another, and in third direction 103, substrate 30 is located between skirt 43 and first sensor 60.

As shown in FIG. 2, functional component 2 includes, for example, a button operated portion 51 and a first contact 52. Button operated portion 51 is a member to be pressed in by the user. Button operated portion 51 is arranged in second through hole 66. First contact 52 is provided on front surface 31 of substrate 30. First contact 52 can be in contact with button operated portion 51. First contact 52 is opposed to a bottom surface of button operated portion 51. First contact 52 is accommodated in housing 3. Button operated portion 51 is exposed to the outside of housing 3 in a direction the same as a direction of exposure of stick operated portion 41 in stick 1, stick operated portion 41 being to be operated by the user. From a different point of view, each of button operated portion 51 and stick operated portion 41 is exposed to the outside of housing 3 in third direction 103.

When the user presses button operated portion 51 in toward front surface 31 of substrate 30, button operated portion 51 comes in contact with first contact 52. Controller 100 thus detects input from the user. When the user releases button operated portion 51, a not-shown pressing-back mechanism moves button operated portion 51 away from first contact 52. A circuit 53 is provided on front surface 31 of substrate 30. Circuit 53 is a circuit for the functional component. Circuit 53 is electrically connected to functional component 2. Specifically, circuit 53 is electrically connected to first contact 52.

Though an example in which functional component 2 is the button is described above, functional component 2 is not limited to the button. Functional component 2 may be, for example, a battery, a wireless communication component, a light-emitting diode, an antenna, or the like. The wireless communication component may support such a communication method as near field communication, Bluetooth®, or infrared communication. Functional component 2 may entirely be located in the inside of housing 3.

Figure 3:
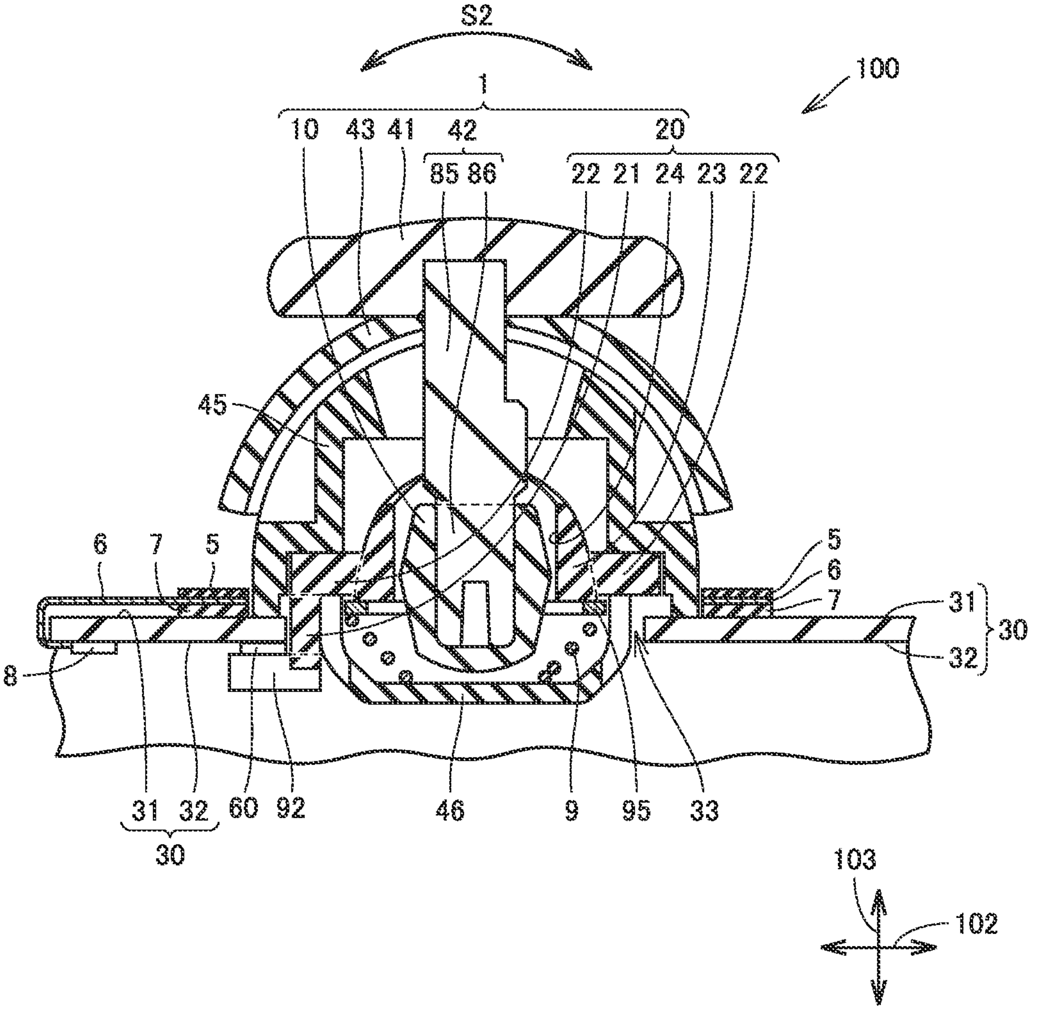
FIG. 3 shows an exemplary illustrative non-limiting drawing of a schematic cross-sectional view along the line III-III in FIG. 1.

FIG. 3 is a schematic cross-sectional view along the line III-III in FIG. 1. The cross-section shown in FIG. 3 is in parallel to second direction 102. As shown in FIG. 3, second member 20 includes a second arm 21, a second rotation shaft 22, and a second main body portion 23. Second arm 21 moves as stick 1 is operated. Second arm 21 extends from front surface 31 side toward rear surface 32 side of substrate 30. Second arm 21 is arranged in through portion 33. Second arm 21 passes through through portion 33 to project from front surface 31 side toward rear surface 32 side. Second arm 21 is contiguous to second rotation shaft 22. Second rotation shaft 22 extends along the direction in parallel to substrate 30. Second rotation shaft 22 extends, for example, along second direction 102.

As shown in FIG. 3, second rotation shaft 22 is contiguous to second main body portion 23. Second rotation shaft 22 may be located on each of opposing sides of second main body portion 23. Second main body portion 23 may be in contact with first main body portion 13. Second main body portion 23 surrounds a part of first member 10. Second main body portion 23 may be arranged in the inside of first casing 45. Second member 20 is arranged on support plate 95. Second member 20 may lie between first casing 45 and second casing 46.

As shown in FIG. 3, controller 100 according to the first embodiment may include a second movable component 92 and a connector 8. Second movable component 92 is provided on rear surface 32 side of substrate 30. Second movable component 92 is moved by second arm 21. Second movable component 92 is engaged with second arm 21. Second arm 21 may be located between coil spring 9 and second movable component 92. First sensor 60 may be provided on the outside of second casing 46. Second movable component 92 may be located opposite to skirt 43 with respect to substrate 30. From a different point of view, in third direction 103, substrate 30 is located between skirt 43 and second movable component 92.

Connector 8 may be provided, for example, on rear surface 32 of substrate 30. Flexible printed circuit 6 is electrically connected to connector 8. Flexible printed circuit 6 may be folded over to have one end located on rear surface 32 side of substrate 30 and to have the other end located on front surface 31 side of substrate 30.

At least one of stick 1, first member 10, and second member 20 may be located in through portion 33. Specifically, a part of central shaft 42 of stick 1 may be located in through portion 33. First rotation shaft 12 and/or first main body portion 13 may be located in through portion 33. Second rotation shaft 22 and/or second main body portion 23 may be located in through portion 33. At least one of stick 1, first member 10, and second member 20 may pass through portion 33 to extend to rear surface 32 side or to somewhere in through portion 33.

Figure 4:
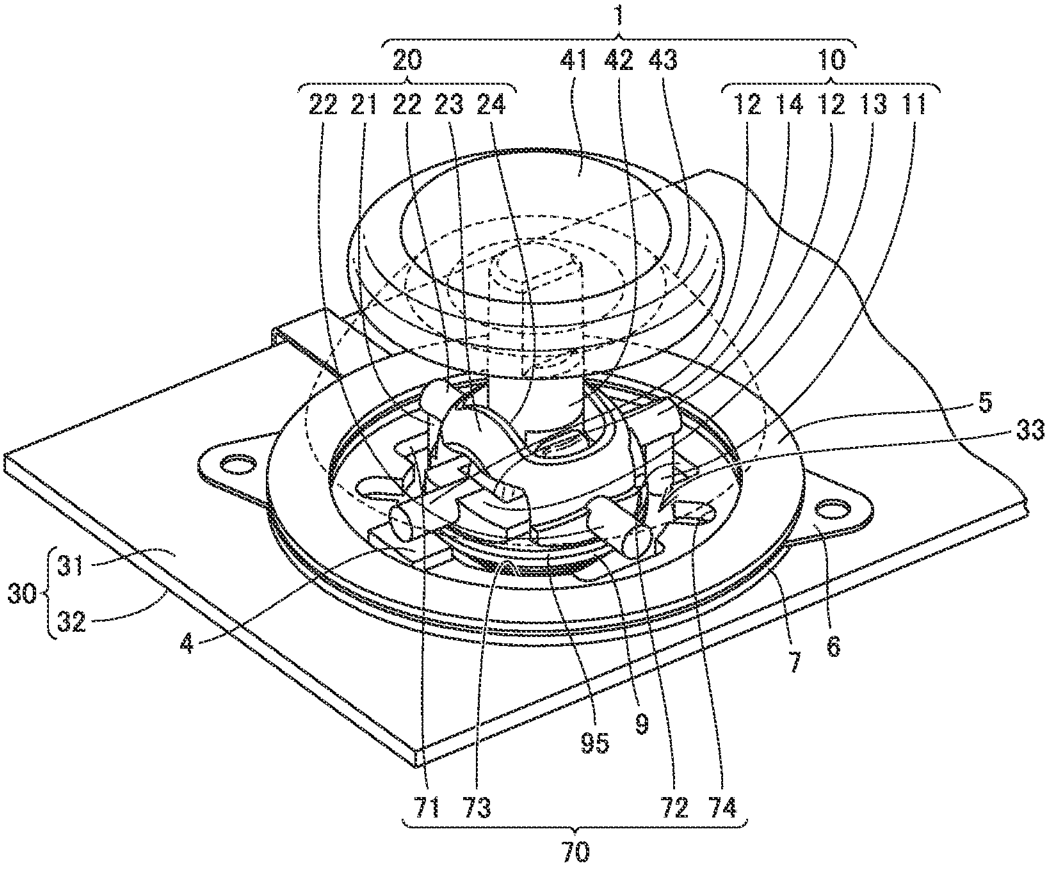
FIG. 4 shows an exemplary illustrative non-limiting drawing of a schematic perspective view showing a construction on a front surface side of the controller according to the first embodiment.

FIG. 4 is a schematic perspective view showing a construction on front surface 31 side of controller 100 according to the first embodiment. In order to illustrate an internal structure of controller 100, FIG. 4 does not show housing 3, first casing 45, and second casing 46 and shows skirt 43 with a dashed line. As shown in FIG. 4, a first insertion hole 14 is provided in first main body portion 13 of first member 10. Similarly, a second insertion hole 24 is provided in second main body portion 23 of second member 20. When viewed in the upward-downward direction, first insertion hole 14 is superimposed on second insertion hole 24. Stick 1 has central shaft 42 inserted in first insertion hole 14 and second insertion hole 24. First main body portion 13 is located between coil spring 9 and second main body portion 23.

First rotation shafts 12 are provided such that first main body portion 13 lies therebetween. First arm 11 is contiguous to one first rotation shaft 12. A direction of extension of first arm 11 may be orthogonal to a direction of extension of first rotation shaft 12. First rotation shaft 12 is provided on front surface 31 side of substrate 30. First rotation shaft 12 is in parallel to front surface 31 of substrate 30. Similarly, second rotation shafts 22 are provided such that second main body portion 23 lies therebetween. Second arm 21 is contiguous to one second rotation shaft 22. A direction of extension of second arm 21 may be orthogonal to a direction of extension of second rotation shaft 22. Second rotation shaft 22 is provided on front surface 31 side of substrate 30. Second rotation shaft 22 is in parallel to front surface 31 of substrate 30. When viewed in the upward-downward direction, the direction of extension of second rotation shaft 22 may be orthogonal to the direction of extension of first rotation shaft 12.

As shown in FIG. 4, controller 100 according to the first embodiment includes a second contact 4. Second contact 4 is provided on front surface 31 of substrate 30. Second contact 4 is, for example, a tact switch. Second contact 4 may be provided in a region opposed to an end of first rotation shaft 12. From a different point of view, second contact 4 is provided under the end of first rotation shaft 12. Stick 1 may be movable as being pressed in in a direction from front surface 31 toward rear surface 32. From a different point of view, stick 1 may be movable in third direction 103. As stick 1 is moved as being pressed in, first rotation shaft 12 of first member 10 is moved toward front surface 31 of substrate 30. The end of first rotation shaft 12 thus comes in contact with second contact 4. As the user releases stick 1, first member 10 moves upward and first rotation shaft 12 moves away from second contact 4 owing to resilience of the button and/or resilience of coil spring 9.

As shown in FIG. 4, restriction portion 5 may be annular. When viewed in the upward-downward direction, restriction portion 5 may surround each of through portion 33, first member 10, second member 20, central shaft 42, and second contact 4. Similarly, flexible printed circuit 6 may be annular. When viewed in the upward-downward direction, flexible printed circuit 6 may surround each of through portion 33, first member 10, second member 20, central shaft 42, and second contact 4. Cushion material 7 may be annular. When viewed in the upward-downward direction, cushion material 7 may surround each of through portion 33, first member 10, second member 20, central shaft 42, and second contact 4.

Skirt 43 is arranged above restriction portion 5. When the user swings stick 1, skirt 43 is inclined to come in contact with restriction portion 5. As a result of contact of skirt 43 with restriction portion 5, load is applied to restriction portion 5.

[B. Method of Operating Stick]

A method of operating stick 1 will now be described.

The user can operate stick 1, for example, along first direction 101 (see FIG. 1). Stick 1 is tilted, for example, to the right or the left along first direction 101. In this case, stick 1 swings along a first direction of swing S1 (see FIG. 2). Similarly, the user can operate stick 1, for example, along second direction 102 (see FIG. 1). Stick 1 is tilted, for example, forward or rearward along second direction 102. In this case, stick 1 swings along a second direction of swing S2 (see FIG. 3). The user can also operate stick 1 along a direction inclined with respect to each of first direction 101 and second direction 102. When the user releases stick 1, stick 1 returns to a central position owing to resilience of coil spring 9.

A center of swing of stick 1 is located at an intersection between first rotation shaft 12 and second rotation shaft 22 that are virtually extended, and it is located, for example, at pullout prevention portion 86. Stick operated portion 41, central shaft 42, and skirt 43 integrally move. When stick 1 swings along first direction of swing S1, second member 20 is moved by central shaft 42 of stick 1. Specifically, second member 20 rotates around second rotation shaft 22 with swing of stick 1. Similarly, when stick 1 swings along second direction of swing S2, first member 10 is moved by central shaft 42 of stick 1. Specifically, first member 10 rotates around first rotation shaft 12 with swing of stick 1. "Rotation" herein means movement along a part of a circle (that is, an arc) around a center of rotation. An angle of rotation may be smaller than 180°.

Restriction portion 5 is provided on front surface 31 side of substrate 30 of controller 100 according to the first embodiment. When stick 1 swings, a lower end of skirt 43 comes in contact with restriction portion 5. Swing of stick 1 is thus stopped. In other words, swing of skirt 43 is restricted by restriction portion 5. Restriction portion 5 does not have to be provided on front surface 31 of substrate 30. In this case, swing of skirt 43 is restricted by front surface 31 of substrate 30.

[C. Substrate]

Figure 5:
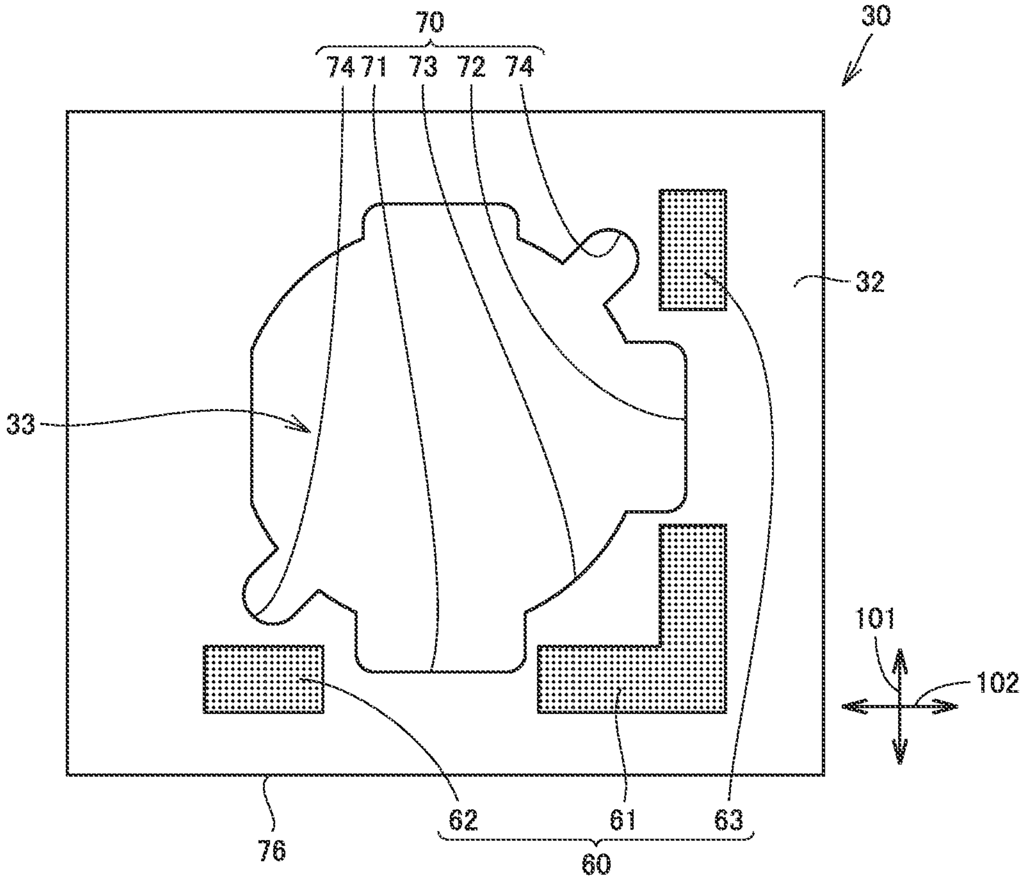
FIG. 5 shows an exemplary illustrative non-limiting drawing of a schematic plan view showing a construction of a rear surface of the substrate of the controller according to the first embodiment.

FIG. 5 is a schematic plan view showing a construction of rear surface 32 of substrate 30 of controller 100 according to the first embodiment. As shown in FIG. 5, substrate 30 includes an inner side surface 70 and an outer-periphery-side surface 76. Through portion 33 is defined by inner side surface 70. Inner side surface 70 is contiguous to each of front surface 31 and rear surface 32. Inner side surface 70 includes a first side surface portion 71, a second side surface portion 72, an arc portion 73, and a pair of third side surface portions 74. First side surface portion 71 extends along second direction 102. Second side surface portion 72 extends along first direction 101. Arc portion 73 is located between first side surface portion 71 and second side surface portion 72. Each of the pair of third side surface portions 72 is, for example, in an arc shape. A straight line that intersects with each of the pair of third side surface portions 74 is inclined with respect to each of first direction 101 and second direction 102.

As shown in FIG. 5, first sensor 60 includes a first region 61, a second region 62, and a third region 63. When viewed in a direction perpendicular to rear surface 32, first region 61 may be, for example, in an L shape. Each of second region 62 and third region 63 is, for example, in a rectangular shape. A longitudinal direction and a direction of a short side of second region 62 may correspond to second direction 102 and first direction 101, respectively. A longitudinal direction and a direction of a short side of third region 63 may correspond to first direction 101 and second direction 102, respectively. First side surface portion 71 may be located between first region 61 and second region 62. Second side surface portion 72 may be located between first region 61 and third region 63, Though a construction in which inner side surface 70 is distant from outer-periphery-side surface 76 is described above, controller 100 according to the present disclosure is not limited to this construction. Specifically, inner side surface 70 may be contiguous to outer-periphery-side surface 76. In this case, through portion 33 is a notch.

Figure 6:
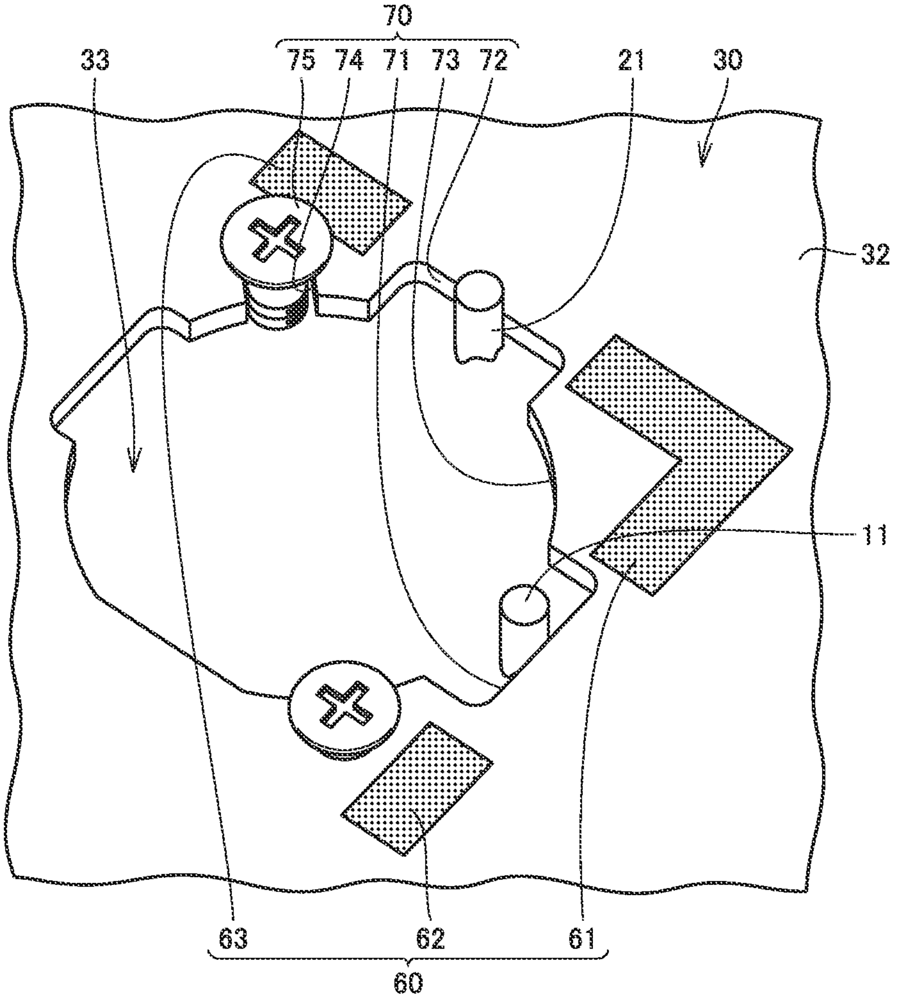
FIG. 6 shows an exemplary illustrative non-limiting drawing of a first schematic perspective view showing a construction on a rear surface side of the controller according to the first embodiment.

FIG. 6 is a first schematic perspective view showing a construction on rear surface 32 side of controller 100 according to the first embodiment. FIG. 6 shows substrate 30, first sensor 60, first arm 11, second arm 21, and a fixing portion 75 and does not show other members. As shown in FIG. 6, fixing portion 75 is arranged in a hole defined by third side surface portion 74. Fixing portion 75 may fix, for example, first casing 45 to substrate 30. First arm 11 is arranged at a position opposed to first side surface portion 71. First arm 11 is movable, for example, along first side surface portion 71. First arm 11 may be, for example, columnar. Similarly, second arm 21 is arranged at a position opposed to second side surface portion 72. Second arm 21 is movable, for example, along a direction in parallel to second side surface portion 72. Second arm 21 may be, for example, columnar.

[D. Motion of Arm]

Figure 7:
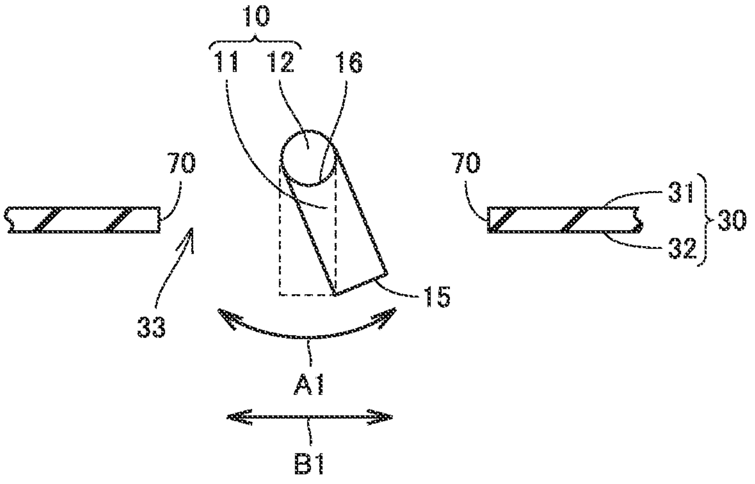
FIG. 7 shows an exemplary illustrative non-limiting drawing of a schematic diagram illustrating a motion of a first arm.

FIG. 7 is a schematic diagram illustrating a motion of first arm 11. As shown in FIG. 7, first arm 11 is arranged in through portion 33 defined by inner side surface 70. FIG. 7 shows with a dashed line, a state where the user is not operating stick 1 and shows with a solid line, a state where first arm 11 has moved as a result of operation onto stick 1 by the user.

As shown in FIG. 7, when the user operates stick 1, first member 10 rotates around first rotation shaft 12 with swing of stick 1. First arm 11 moves with rotation of first rotation shaft 12. Specifically, first arm 11 rotates around first rotation shaft 12. A direction of rotation of first arm 11 is a first direction of rotation A1.

First arm 11 includes a first front-surface-side end 16 and a first rear-surface-side end 15. First front-surface-side end 16 is contiguous to first rotation shaft 12. First rear-surface-side end 15 is located opposite to first front-surface-side end 16. In the upward-downward direction, front surface 31 of substrate 30 is located between first front-surface-side end 16 and rear surface 32. Similarly, in the upward-downward direction, rear surface 32 of substrate 30 is located between first rear-surface-side end 15 and front surface 31. First rear-surface-side end 15 rotates around first rotation shaft 12 with rotation of first rotation shaft 12. A direction of projection of first direction of rotation A1 on rear surface 32 is a first direction of movement B1.

Figure 8:
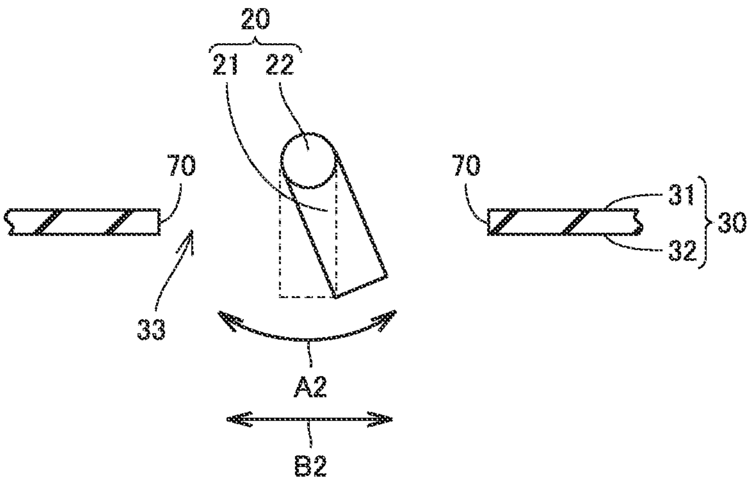
FIG. 8 shows an exemplary illustrative non-limiting drawing of a schematic diagram illustrating a motion of a second arm.

FIG. 8 is a schematic diagram illustrating a motion of second arm 21. Since the motion of second arm 21 is substantially similar to the motion of first arm 11, description will not be given. The direction of rotation of second arm 21 is a second direction of rotation A2. A direction of projection of second direction of rotation A2 on rear surface 32 is a second direction of movement B2. Second direction of rotation A2 is different from first direction of rotation A1. When viewed in the upward-downward direction, second direction of rotation A2 and first direction of rotation A1 may be orthogonal to each other.

[E. Motion of Movable Component]

Figure 9:
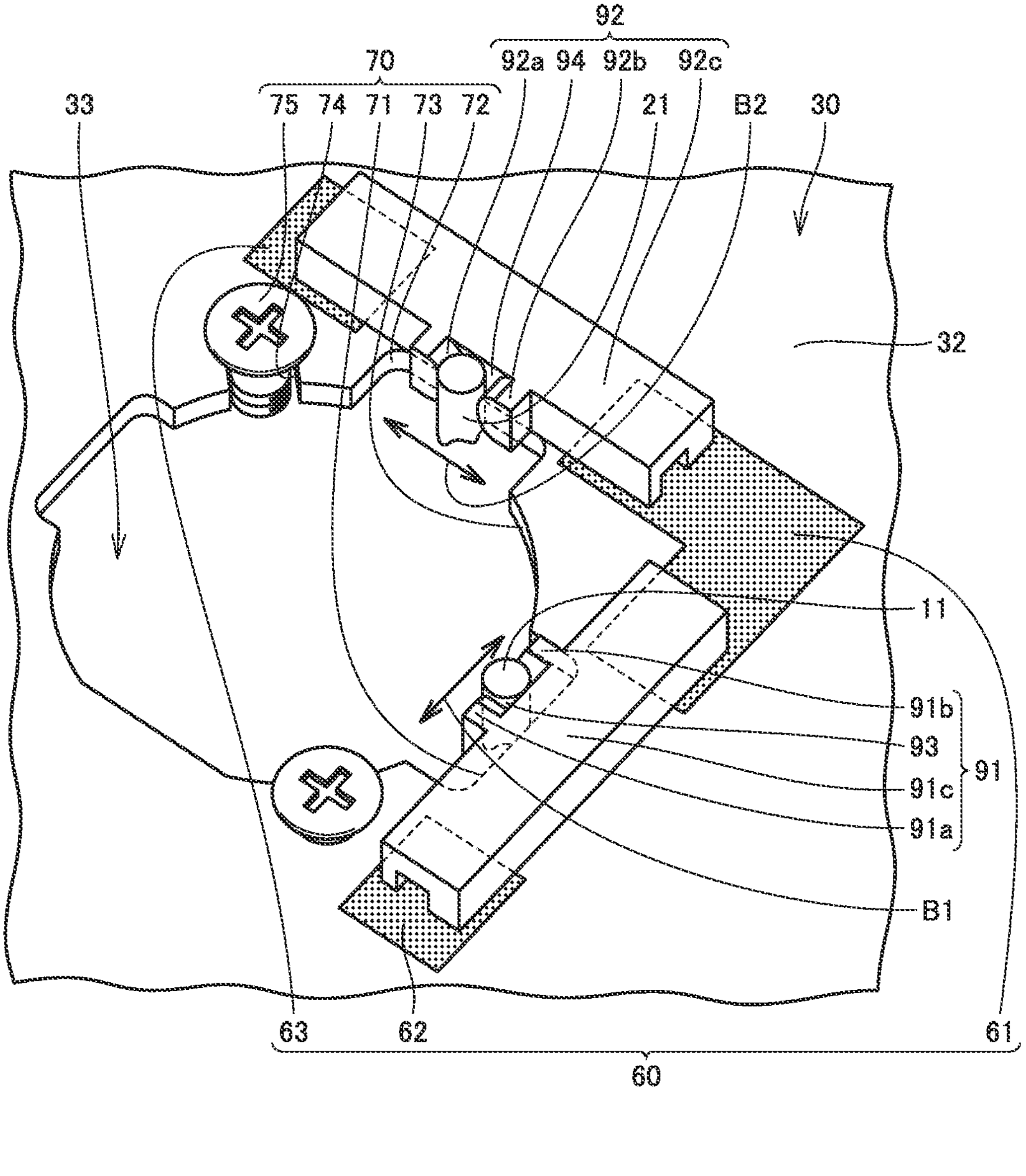
FIG. 9 shows an exemplary illustrative non-limiting drawing of a second schematic perspective view showing a construction on the rear surface side of the controller according to the first embodiment.

FIG. 9 is a second schematic perspective view showing a construction on rear surface 32 side of controller 100 according to the first embodiment. FIG. 9 further shows a first movable component 91 and a second movable component 92, in addition to features shown in FIG. 6. As shown in FIG. 9, each of first movable component 91 and second movable component 92 is provided on rear surface 32 side of substrate 30. In other words, each of first movable component 91 and second movable component 92 is provided at a position opposed to rear surface 32 of substrate 30.

As shown in FIG. 9, first movable component 91 is provided with a first engagement portion 93. First engagement portion 93 is, for example, a recess. First arm 11 is engaged with first engagement portion 93. First arm 11 moves movable component 91 with rotation of first rotation shaft 12. Specifically, when first arm 11 moves with rotation of first rotation shaft 12, first movable component 91 is moved with the motion of first arm 11. First movable component 91 is movable in a direction in parallel to substrate 30. Specifically, first movable component 91 moves in first direction of movement B1. When viewed in the direction perpendicular to rear surface 32 of substrate 30, the direction of movement of first movable component 91 is the same as the direction of movement of first arm 11.

First movable component 91 includes a first slide member 91*a*, a second slide member 91*b*, and a first main body member 91*c*. Each of first slide member 91*a* and second slide member 91*b* is contiguous to first main body member 91*c*. First main body member 91*c* includes a not-shown first electrically conducting member made of metal. First arm 11 is located between first slide member 91*a* and second slide member 91*b*.

A first electrically conductive member has one end in contact, for example, with second region 62. The first electrically conductive member has the other end in contact, for example, with first region 61. When first movable component 91 moves, an electrical resistance between second region 62 and first region 61 may vary. First sensor 60 may thus detect the motion of first movable component 91. In this case, first sensor 60 indirectly detects the motion of first arm 11 by making use of the motion of first movable component 91. A direction of movement and a distance of movement of stick 1 may be estimated based on a position of first movable component 91.

Alternatively, first arm 11 does not have to be engaged with first movable component 91. For example, a rotary motion of first arm 11 may be converted to a linear motion of first movable component 91 with a link member (not shown) being interposed, the link member connecting first arm 11 and first movable component 91 to each other. The first movable component may thus be constructed to move with respect to the motion of first arm 11. Alternatively, controller 100 does not have to include first movable component 91. In this case, first sensor 60 may directly detect the motion of first arm 11. First sensor 60 may be, for example, a variable resistor directly engaged with first arm 11. A resistance of the variable resistor may vary as a result of the motion of first arm 11. First sensor 60 can directly or indirectly detect the motion of first arm 11 as above.

As shown in FIG. 9, second movable component 92 is provided with a second engagement portion 94. Second movable component 92 includes a third slide member 92*a*, a fourth slide member 92*b*, and a second main body member 92*c*. Second arm 21 moves second movable component 92 with rotation of second rotation shaft 22. Second movable component 92 moves in second direction of movement B2. Second direction of movement B2 may be orthogonal to first direction of movement B1. Since the motion of second movable component 92 is substantially similar to the motion of the first operating component, description thereof will not be given.

[F. Second Sensor]

Figure 10:
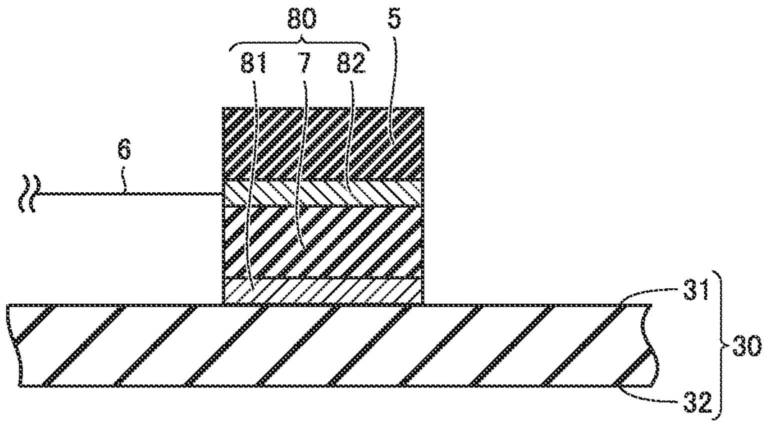
FIG. 10 shows an exemplary illustrative non-limiting drawing of a schematic cross-sectional view showing a construction of a second sensor.

FIG. 10 is a schematic cross-sectional view showing a construction of second sensor 80. As shown in FIG. 10, second sensor 80 may be composed of first electrode 81, cushion material 7, and second electrode 82. Cushion material 7 lies between first electrode 81 and second electrode 82. Second sensor 80 is, for example, a capacitance sensor. Second sensor 80 is provided, for example, between restriction portion 5 and front surface 31 of substrate 30. Second sensor 80 may be provided in restriction portion 5.

When skirt 43 comes in contact with restriction portion 5 as a result of operation onto stick 1 by the user, load is applied to second sensor 80. Cushion material 7 thus deforms. Consequently, the distance between first electrode 81 and second electrode 82 varies. As a result, the capacitance of second sensor 80 varies. In other words, second sensor 80 detects the capacitance that varies as a result of contact of skirt 43. The load may be calculated based on the capacitance between first electrode 81 and second electrode 82 or on variation in capacitance. Controller 100 may include a not-shown computer. The computer may calculate the load based on the capacitance or on variation in capacitance. The computer may calculate an amount of tilt of stick 1 based on a value of the electrical resistance or variation in value of the electrical resistance detected by first sensor 60.

The computer may carry out certain control linearly or stepwise depending on the detected capacitance or the calculated load. The computer may carry out certain control in response to the load exceeding a certain threshold value. Though an example in which second sensor 80 is the capacitance sensor is described above, second sensor 80 is not limited to the capacitance sensor. Second sensor 80 may be, for example, a strain gauge, a magnetic sensor, or a pressure sensor.

Second Embodiment

A construction of controller 100 according to a second embodiment will now be described. Controller 100 according to the second embodiment is different from controller 100 according to the first embodiment mainly in that substrate 30 is located below central shaft 42, whereas it is otherwise similar to controller 100 according to the first embodiment. Features different from controller 100 according to the first embodiment will now mainly be described.

Figure 11:
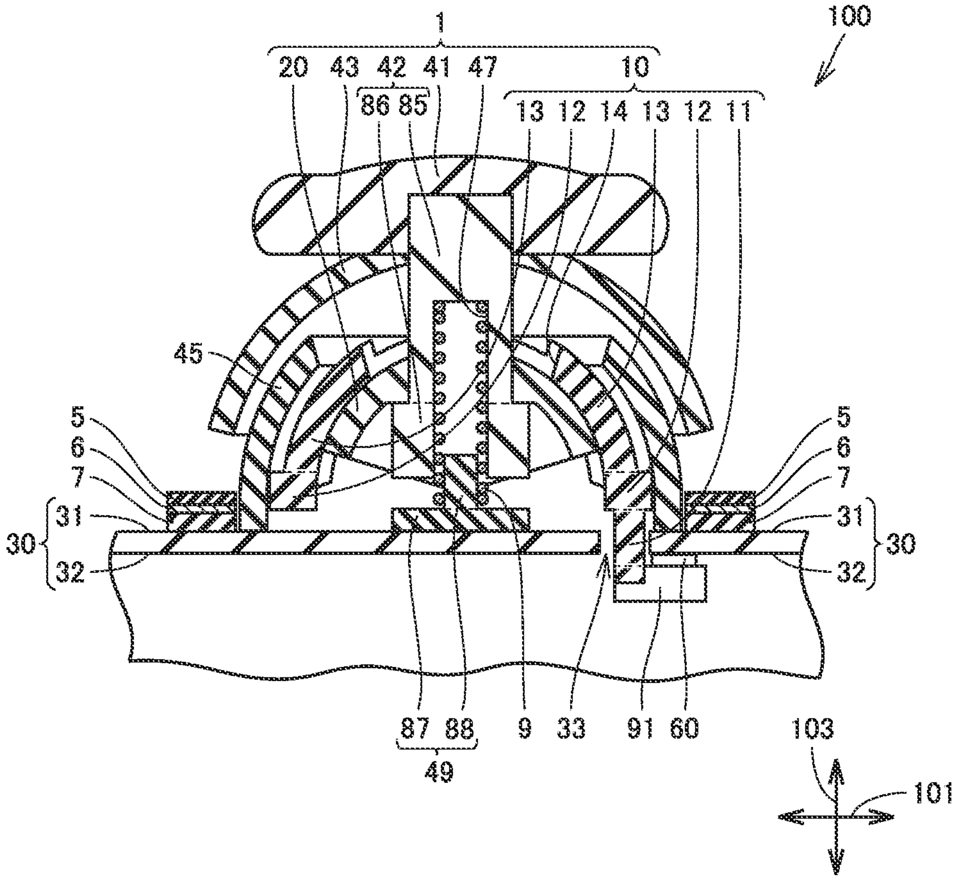
FIG. 11 shows an exemplary illustrative non-limiting drawing of a schematic cross-sectional view showing a construction of the controller according to a second embodiment.

FIG. 11 is a schematic cross-sectional view showing the construction of controller 100 according to the second embodiment. The cross-section shown in FIG. 11 corresponds to the cross-section shown in FIG. 2. As shown in FIG. 11, substrate 30 is provided with through portion 33. First arm 11 is arranged in through portion 33. Through portion 33 is not provided below central shaft 42. From a different point of view, substrate 30 is located below central shaft 42. Substrate 30 is opposed to central shaft 42.

In first direction 101, pullout prevention portion 86 is larger in width than main body portion 85. Pullout prevention portion 86 is in contact with a lower end surface of second member 20. Stick 1 is thus prevented from coming off upward. Central shaft 42 is provided with a spring arrangement hole 47. Spring arrangement hole 47 passes through pullout prevention portion 86 to reach main body portion 85. Coil spring 9 is arranged in spring arrangement hole 47. Coil spring 9 has an upper end in contact with the bottom of spring arrangement hole 47. Parts that form stick 1 may integrally be formed. For example, stick operated portion 41 that forms stick 1 may be integrated with main body portion 85 and pullout prevention portion 86.

Controller 100 according to the second embodiment includes a spring support portion 49. Spring support portion 49 is arranged on front surface 31 of substrate 30. Spring support portion 49 includes a base portion 87 and a projecting portion 88. Projecting portion 88 is provided on base portion 87. Base portion 87 is located between front surface 31 of substrate 30 and projecting portion 88. Coil spring 9 is arranged around projecting portion 88. A part of projecting portion 88 is inserted in spring arrangement hole 47. In spring arrangement hole 47, coil spring 9 may be located on the outside of projecting portion 88 and in the inside of an inner wall portion that defines spring arrangement hole 47. Coil spring 9 may have a lower end in contact with base portion 87.

Controller 100 according to the second embodiment includes substrate 30 in a region opposed to central shaft 42. Therefore, controller 100 according to the second embodiment can be higher in strength than controller 100 according to the first embodiment.

(Modification)

First member 10 may swing in the first direction of swing with swing of stick 1. Second member 20 may swing in the second direction of swing with swing of stick 1. The second direction of swing is different from the first direction of swing. When viewed in the upward-downward direction, the second direction of swing and the first direction of swing may be orthogonal to each other. First arm 11 may move with swing of first member 10. Second arm 21 may move with swing of second member 20.

Each of first member 10 and second member 20 may swing as rotating around a certain virtual center, without including a physical rotation shaft. Each of first member 10 and second member 20 may swing, for example, along a guide. In another manner, each of first member 10 and second member 20 does not have to have a virtual center. Each of first member 10 and second member 20 may swing in a prescribed curve. Each of first member 10 and second member 20 may swing, for example, along an elliptic arc.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A controller comprising:

a substrate;

a stick configured to be operated by a user; and a button, wherein the substrate includes a front surface and a rear surface opposite the front surface, the stick includes an arm configured to move when the stick is operated, the arm extending from a side of the front surface toward a side of the rear surface, and the substrate includes a circuit provided on the front surface and electrically connected to the button, a first sensor provided on the rear surface, the first sensor configured to directly or indirectly detect motion of the arm the stick includes a first member configured to rotate in a first direction of rotation with swing of the stick, and a second member configured to rotate in a second direction of rotation with swing of the stick, the second direction of rotation being different from the first direction of rotation, the first member includes a first rotation shaft that is parallel to the substrate and provided on the side of the front surface, the second member includes a second rotation shaft, and the arm is configured to move with rotation of the first rotation shaft.

2. The controller according to claim 1, further comprising a movable component provided on the side of the rear surface, the movable component being movable in a direction in parallel to the substrate, wherein the arm is configured to move the movable component with rotation of the first rotation shaft, and the first sensor is configured to detect motion of the movable component.

3. The controller according to claim 2, wherein the arm is connected to the first rotation shaft, and a rear-surface-side end of the arm is configured to rotate around the first rotation shaft, with rotation of the first rotation shaft.

4. The controller according to claim 2, wherein the stick is provided with a skirt, the front surface or a restriction portion provided on the front surface is configured to restrict swing of the skirt with swing of the stick, and the movable component or the first sensor is provided on a side opposite the skirt with respect to the substrate.

5. The controller according to claim 4, further comprising a second sensor, wherein the second sensor is provided in the restriction portion or between the restriction portion and the front surface.

6. The controller according to claim 5, wherein the second sensor includes a first electrode, and a second electrode distant from the first electrode, the second sensor is configured to detect a capacitance is variable in response to contact with the skirt, the controller further comprises a flexible printed circuit electrically connected to the first electrode, and the second electrode is provided on the substrate.

7. The controller according to claim 1, wherein the substrate comprises a hole or a notch, and at least one of the stick, the first member, and the second member is located in the hole or the notch.

8. The controller according to claim 1, wherein the stick includes the first member is configured to swing in a first direction of swing with swing of the stick, and the second member is configured to swing in a second direction of swing with swing of the stick, the second direction of swing being different from the first direction of swing, and the arm is configured to move with swing of the first member.

9. The controller according to claim 1, wherein the button includes a button operated portion configured to be pressed in by the user, and a first contact configured to contact the button operated portion, the controller comprises a housing that accommodates the first contact, the first contact is located on the substrate, and the button operated portion is exposed to outside of the housing in a direction identical to a direction of exposure of a stick operated portion in the stick, and the stick operated portion is configured to be operated by the user.

10. The controller according to claim 1, wherein the stick is configured to be pressed in a direction from the front surface toward the rear surface, the controller further comprises a second contact that is in contact with the first rotation shaft when the stick is pressed in the direction from the front surface toward the rear surface, and the second contact is provided in a region in the front surface, the region being opposed to an end of the first rotation shaft.

* * * * *